(12) United States Patent
Yoshikawa et al.

(10) Patent No.: US 6,167,691 B1
(45) Date of Patent: Jan. 2, 2001

(54) GASIFICATION POWER GENERATION SYSTEM USING PREHEATED GASIFYING-AGENT TO GASIFY FUEL

(75) Inventors: Kunio Yoshikawa, Sagamihara; Keiji Murata, Yokohama; Michio Hori, Yokohama; Takashi Ogawa, Yokohama; Masakuni Sasaki, Setagaya-ku; Masafumi Fukuda, Urawa, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/030,011

(22) Filed: Feb. 25, 1998

(30) Foreign Application Priority Data

Feb. 25, 1997 (JP) .................................................. 9-040568

(51) Int. Cl.[7] ...................................................... F02C 3/28
(52) U.S. Cl. .................. 60/39.12; 60/39.182; 60/39.511
(58) Field of Search ............................. 60/39.12, 39.464, 60/39.511, 39.182

(56) References Cited

U.S. PATENT DOCUMENTS 5,265,410 * 11/1993 Hisatome ............................. 60/39.12

OTHER PUBLICATIONS

Kunio Yoshikawa, et al., Proceedings of the 5th National Symposium on Power and Energy Systems, No. 96–3, pp. 59 to 64, "Development of High Temperature Filter for Molten Coal Slag Removal", Nov. 13 and 14, 1996.

K. Yoshikawa, et al. Proceedings of the 32nd Intersociety Energy Conversion Engineering Conference, vol. 2, pp. 932 to 937, "Innovative Coal Gasification System with High Temperature Air", Jul. 27 to Aug. 1, 1997.

Kunio Yoshikawa, et al., Proceedings of the 1997 International Joint Power Generation Conference, vol. 1, pp. 279 to 285, "High Temperature Air Coal Combustion Utilizing Multi–Staged Enthalpy Extraction Technology", 1997.

K. Yoshikawa, et al., Proceedings International Conference on Power Engineering—97, Tokyo, vol. 2 , pp. 391 to 396, High Temperature Air Combustion—Revolution of Combustion Technology, Jul. 13 to 17, 1997.

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A gasification power generation system includes: a gasifying section for allowing a fuel, such as coal, to react with a gasifying agent, such as air, to produce a gasified product gas; a power-generating section for generating electricity using energy obtained by burning the gasified product gas, which is produced by the gasifying section; and a preheating section for preheating the gasifying agent supplied to the gasifying section, to a self ignition temperature of, e.g., about 1000° C. The preheating section raises the temperature of air supplied into the gasifying section, to a high temperature of about 1000° C. when a fossil fuel, such as coal, is used as the fuel. Thus, it is possible to achieve gasification power generation with a high generating efficiency using inexpensive, simple constructions and to realize a stable and low NOx combustion of the gasified product gas.

9 Claims, 12 Drawing Sheets

GASIFICATION POWER GENERATION SYSTEM USING PREHEATED GASIFYING-AGENT TO GASIFY FUEL

BACKGROUND OF THE INVENTION

The present invention relates generally to a gasification power generation system. More specifically, the invention relates to a gasification power generation system for gasifying a fossil fuel, such as coal, a gas or a heavy oil, or a fuel, such as domestic or industrial waste, with a gasifying agent, such as oxygen or air, to produce a fuel gas to generate electricity using the product fuel gas.

Among fuels generally called fossil fuels, coal is widely distributed over the world in comparison with petroleum and natural gases, and the reserve thereof is high, so that there are great expectations that coal will be used as a fuel for power generation in future. As a power generation method using coal as a fuel, a pulverized-coal thermal power generation for grinding coal into pulverized coal to burn the pulverized coal is well known. However, since the pulverized-coal thermal power generation has problems on thermal efficiency and environmental suitability, coal gasification power generation systems for gasifying coal and burning the product fuel gas have been developed.

In the coal gasification power generation system, a gasifying agent, such as air or oxygen, and coal serving as a fuel are gasified using gasifying means to produce a gasified product gas, and a gas turbine is rotated by a combustion exhaust gas to generate electricity. There has been also proposed an integrated coal gasification combined cycle power generation system for utilizing the exhaust heat of a gasified product gas, which has been used to rotate a gas turbine, to produce steam to rotate a steam turbine to generate electricity. The integrated coal gasification combined cycle power generation system can use coal, which has a relatively great reserve and which is widely distributed over the world, to generate electricity at low costs, and use the gas turbine combined with the steam turbine, so that it is possible to efficiently generate electricity without wasting the exhaust heat of the gas turbine.

As a gasifying agent, air is directly used as mentioned above, or oxygen or oxygen-enriched air is used. In order to remove ash contents, which are contained in coal, as a molten slat in a molten state from a gasifier, it is required to raise the temperature in the gasifier to a high temperature of 1600° C. to 1700° C. However, in the case of an air-blast type integrated coal gasification combined cycle power generation system, which uses air as a gasifying agent, since air serving as the gasifying agent is supplied to a gasifier at a relatively low temperature of about 300° C. to 400° C., it is not possible to sufficiently raise the temperature in the gasifier, so that there is a problem in that the gasifier is obstructed by slag, which has not been sufficiently molten.

When a great deal of air is blown to raise the temperature in the gasifier, the rate of completed burned coal is increased, and the amount of nitrogen in the gasified product gas is also increased. As a result, the hearing value of the gasified product gas is small, and it is difficult to maintain stable combustion in a combustion equipment for a gas turbine. In order to eliminate the above disadvantages in the air-blast type integrated coal gasification combined cycle power generation system, an oxygen-blast type integrated coal gasification combined cycle power generation system as shown in FIG. 1 has been proposed as an example of a conventional coal gasification power generation system.

Figure 1:
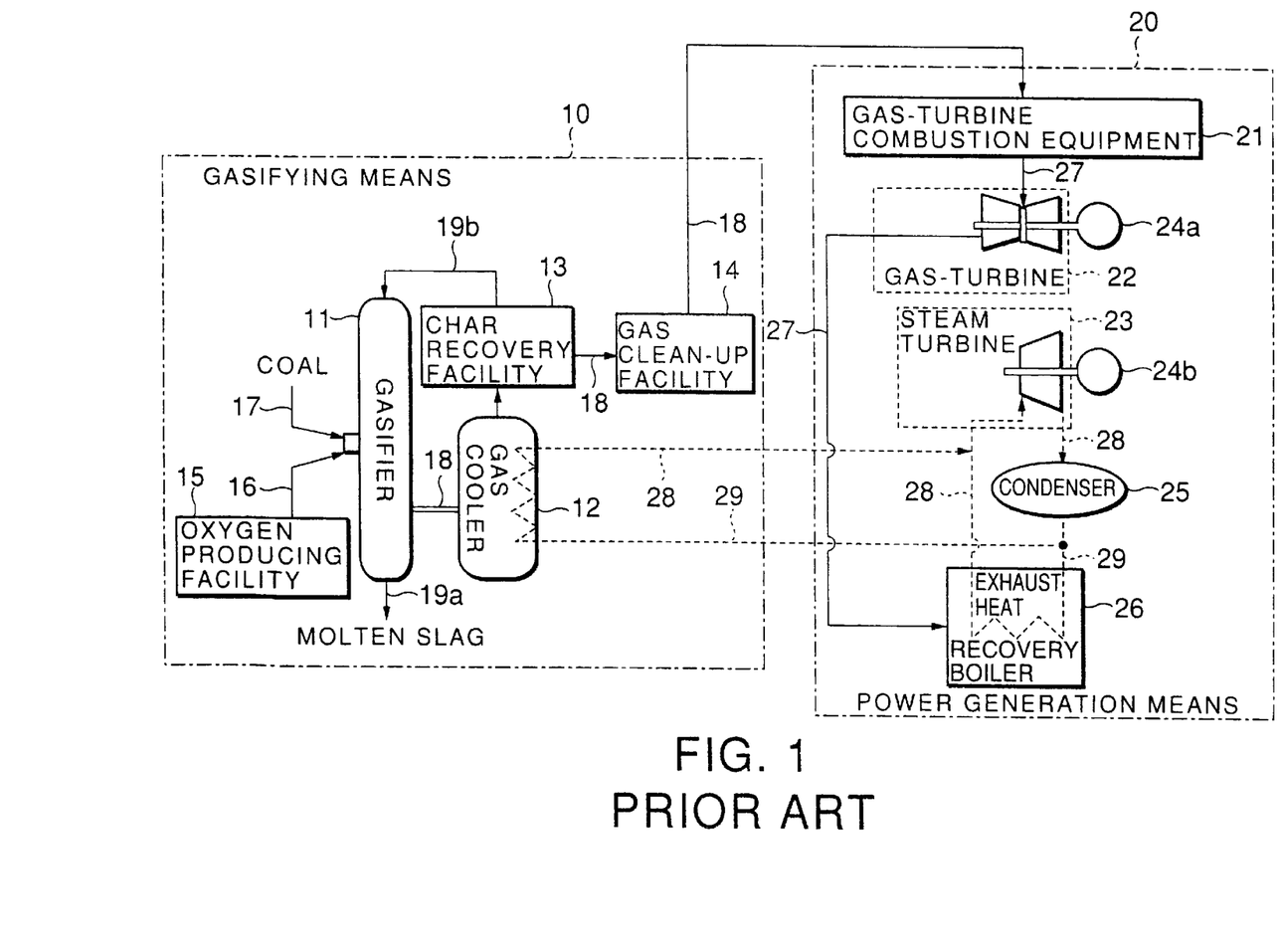
FIG. 1 is a block diagram of a conventional gasification power generation system.

FIG. 1 is a block diagram of a schematic system of an integrated coal gasification combined cycle power plant. In FIG. 1, the integrated coal gasification combined cycle power plant comprises gasifying means 10 and power generation means 20. The gasifying means 10 comprises a gasifier 11, a gas cooler 12, a char recovery facility 13, a gas clean-up facility 14, and an oxygen producing facility 15. The power generating means 20 comprises a gas-turbine combustion equipment 21, a gas turbine 22, a steam turbine 23, generators 24a, 24b, a condenser 25, and an exhaust heat recovery boiler 26. With this construction, the operation of the integrated coal gasification combined cycle power plant will be described below.

First, an oxygen-enriched air 16 produced by the oxygen producing facility 15 and a coal 17 are supplied to the gasifier 11 to be gasified therein to produce a gasified product gas 18. The principal components of the gasified product gas 18 include carbon monoxide, hydrogen, carbon dioxide, steam and so forth. The ash contents in the coal 17 are discharged as a molten slag 19a from the bottom of the gasifier 11. The gasified product gas 18 is cooled to a suitable temperature (e.g., about 500° C.) by means of the gas cooler 12 to be fed to the gas clean-up facility 14 via the char recovery facility 13. Most of a char 19b (the principal components of which include unburned carbon and ash contents) contained in the gasified product gas 18 is recovered by the char recovery facility 13 to be recycled in the gasifier 11. The gas clean-up facility 14 removes sulfur contents and fine particles, which cause the corrosion and wear of the gas turbine 22, to supply a clean product gas to the gas-turbine combustion equipment 21.

The gasified product gas 18 cleaned by the gas clean-up facility 14 is burned by the gas-turbine combustion equipment 21 to produce a combustion exhaust gas 27, which rotates the gas turbine 22 to cause the generator 24a to generate electricity. The heat of the combustion exhaust gas 27 discharged from the gas turbine 22 is heat-recovered by the exhaust heat recovery boiler 26, and the recovered heat produces a steam 28 to rotate the steam turbine 23. This rotating force causes the generator 24b to generate electricity. The steam 28 discharged from the steam turbine 23 is condensed into a water 29 by means of the condenser 25 to be recycled in the exhaust heat recovery boiler 26. The heat recovered by the gas cooler 12 is also utilized to produce the steam 28. The water 29 condensed by the condenser 25 is supplied to the exhaust heat recovery boiler 26 as well as the gas cooler 12, which forms the gasifying means 10, to cool the gasified product gas 18.

In the conventional oxygen-blast type integrated coal gasification combined cycle power generation system, which has the above construction and operation, it is possible to produce a high-temperature gasified product gas in the gasifier 11 while maintaining the molten state of the slag. Therefore, it is possible to prevent the gasifier from being obstructed by solidified slag, and it is possible to prevent nitrogen components from being excessive to stabilize combustion in the gas-turbine combustion equipment. In the above described conventional integrated coal gasification combined cycle power plant, in order to solve the above described problems of the air-blast type coal gasification means, pure oxygen or oxygen-enriched air is used as a gasifying agent in place of air to decrease the amount of nitrogen in the gasified product gas.

However, in the conventional coal gasification power generation system for performing oxygen blast, it is required to provide an oxygen producing facility or an oxygen-enriched air producing facility to produce oxygen or oxygen-enriched air producing facility to produce oxygen or oxygen-enriched air blown into the gasifying means as a gasifying agent, so that there is a problem in that power consumed in the power generation system in increased to considerably decrease the generating efficiency in the whole system. Also in the oxygen-blast type coal gasification power generation system, if temperature in the gasifier is not sufficiently raised, a great deal of char is discharged from the gasifier while being contained in the gasified product gas. Therefore, there is a problem in that it is required to provide a large scale char recovery facility, so that the plant is complicated and the manufacturing costs are increased.

Moreover, in the conventional integrated coal gasification combined cycle power plant, the gasified product gas produced by the gasifier is cooled to a suitable temperature of about 500° C. by means of the gas cooler 12 to be fed to the gas clean-up facility 14, and the heat recovered by the gas cooler 12 is fed to the steam turbine 23 in the form of steam 28. Therefore, a high grade energy of higher than or equal to 1000° C., which is included in the gasified product gas 18 in the form of sensible heat, is decreased to a low grade energy of about 500° C. to generate electricity. This causes thermal efficiency to be very disadvantageous, so that there is a problem in that the generating efficiency is lowered.

In addition, the gasified product gas obtained by gasifying coal or the like with air or oxygen-enriched air has only a far lower heating value than that of a neutral gas or the like. Therefore, in order to obtain a high-temperature combustion exhaust gas in the gas-turbine combustion equipment, the amount of air which can be distributed to the inner tube of the combustion equipment must be suppressed so as to decrease the amount of air, so that it is difficult to provide stable combustion with a low concentration of nitrogen oxides (NOx).

SUMMARY OF THE INVENTION

It is therefore an object of the present invention to eliminate the aforementioned problems of the conventional coal gasification power generation system and to provide a gasification power generation system, which can provide stable and low NOx combustion and which is inexpensive and has a simple construction.

In order to accomplish the aforementioned and other objects, according to one aspect of the present invention, a gasification power generation system comprises: gasifying means for allowing a fuel to react with a gasifying agent to produce a gasified product gas; power generation means for generating electricity using energy obtained by burning the gasified product gas, which is produced by the gasifying means; and preheating means for preheating the gasifying agent, which is supplied to the gasifying means, to a self ignition temperature.

The preheating means may comprise heat regenerator means for preheating the gasifying agent supplied to the gasifying means, using the sensible heat of the gasified product gas, which is produced by the gasifying means.

The preheating means may have preheating combustion means for burning the gasified product gas to produce a high-temperature gasified product gas, the temperature of which is higher than or equal to the self ignition temperature of the fuel.

In the gasification power generation system, a part or all of the gasified product gas may pass through the heat regenerator means, and the gasifying agent may pass through the heat regenerator means, to be preheated to be supplied to the gasifying means.

The heat regenerator may have a plurality of heat reservoirs, the gasifying agent passing through a first heat reservoir of the plurality of heat reservoirs, a part or all of the gasified product gas passing through a second heat reservoir of the plurality of heat reservoirs, which is different from the first heat reservoir, through which the gasifying agent passes, and the gasifying agent may be preheated to a self ignition temperature by alternately switching the gasifying agent passing through the first heat reservoir and the gasified product gas passing through the second heat reservoir.

In the gasification power generation system, a high-temperature dust collector may be provided between the gasifying means and the heat regenerator means, and a gasified product gas passing through the heat regenerator means to be temperature-dropped may be mixed with a gasified product gas produced by the gasifying means, to be introduced into the high-temperature dust collector.

The gasifying means may have therein preventing means for preventing char or ash contents from escaping from the gasifying means with the gasifying product gas.

The preheating means may comprise high-temperature gas producing means for burning a part of the gasified product gas, which is produced by the gasifying means, to preheat the gasifying agent using the generated heat of combustion.

As described above, according to a gasification power generation system of the present invention, after air serving as a gasifying agent blown into the gasifying means is preheated to a high temperature of about 1000° C., which is a self ignition temperature of the fuel, with the sensible heat of a gasified product gas, the air preheated to the high temperature is supplied to a gasifier to gasify a fuel, so that the interior of the gasifier can be maintained at a high temperature sufficient to melt ash contents. Therefore, it is possible to easily discharge slag, and it is possible to considerably decrease the amount of char escaping from the gasifier with the gasified product gas.

In addition, since the air preheated to the high temperature of about 1000° C., which is the self ignition temperature of the fuel, is supplied to the gasifier to gasify the fuel, the amount of air required to maintain the temperature in the gasifier at a high temperature is decreased, so that the rate of completely burned fuel is decreased, and the amount of nitrogen in the gasified product gas is decreased. Consequently, the heating value of the gasified product gas is increased, so that it is possible to easily maintain stable combustion in the combustion equipment. Moreover, since the air is preheated to about 1000° C. using a high grade energy or higher than or equal to 1000° C., which is the sensible heat of the gasified product gas, the high grade energy is directly utilized without decreasing temperature.

Moreover, according to the above described gasification power generation system, since the gasified product gas is burned with the high-temperature air of about 1000° C., namely, High Temperature Air Combustion, which is the self ignition temperature of the fuel, the concentration of nitrogen oxides (NOX) contained in the combustion exhaust gas is decreased and the combustion state in the gas-turbine combustion equipment is stabilized even if the gasified product gas is produced from a low calorie fuel, such as coal, having a low heating value.

As described above, according to the gasification power generation system of the present invention, after the air is preheated to the high temperature of about 1000° C., which is the self ignition temperature of the fuel, with the sensible heat of the gasified product gas, the air preheated to the high temperature is supplied to the gasifier to gasify the fuel, so that the interior of the gasifier can be maintained at a high temperature sufficient to melt ash contents.

Therefore, it is possible to easily discharge slag, and it is also possible to considerably decrease the amount of char escaping from the gasifier with the gasified product gas. Consequently, it is possible to omit the oxygen producing facility and/or the char recovery facility, or decrease the sizes thereof, so that it is possible to reduce the costs of the systems. Moreover, since it is possible to decrease power required to produce oxygen or oxygen-enriched air, it is possible to considerably improve the generating efficiency.

In addition, since the air preheated to a high temperature of about 1000° C. is supplied to the gasifier to gasify the fuel, the amount of air required to maintain the temperature in the gasifier at a high temperature is decreased, so that the rate of the completely burned fuel is decreased, and the amount of nitrogen in the gasified product gas is decreased. Consequently, the heating value of the gasified product gas is increased, so that it is possible to easily maintain stable combustion in the combustion equipment.

In addition, according to the gasification combined cycle power generation system of the present invention, the air is preheated to about 1000° C. with a high grade energy of higher than or equal to 1000° C., which is the sensible heat of the gasified product gas. That is, since the high grade energy is directly utilized without decreasing temperature, it is possible to further improve the generating efficiency.

Moreover, since the gasified product gas is burned with the high-temperature air of about 1000° C., namely, High Temperature Air Combustion, the NOX concentration in the combustion exhaust gas is low and it is possible to achieve stable combustion even if the gasified product gas is a low calorie fuel having a low heating value.

DESCRIPTION OF THE PREFERRED EMBODIMENTS

Referring now to the accompanying drawings, the preferred embodiments of a gasification power generation system, according to the present invention, will be described in detail below.

Figure 2:
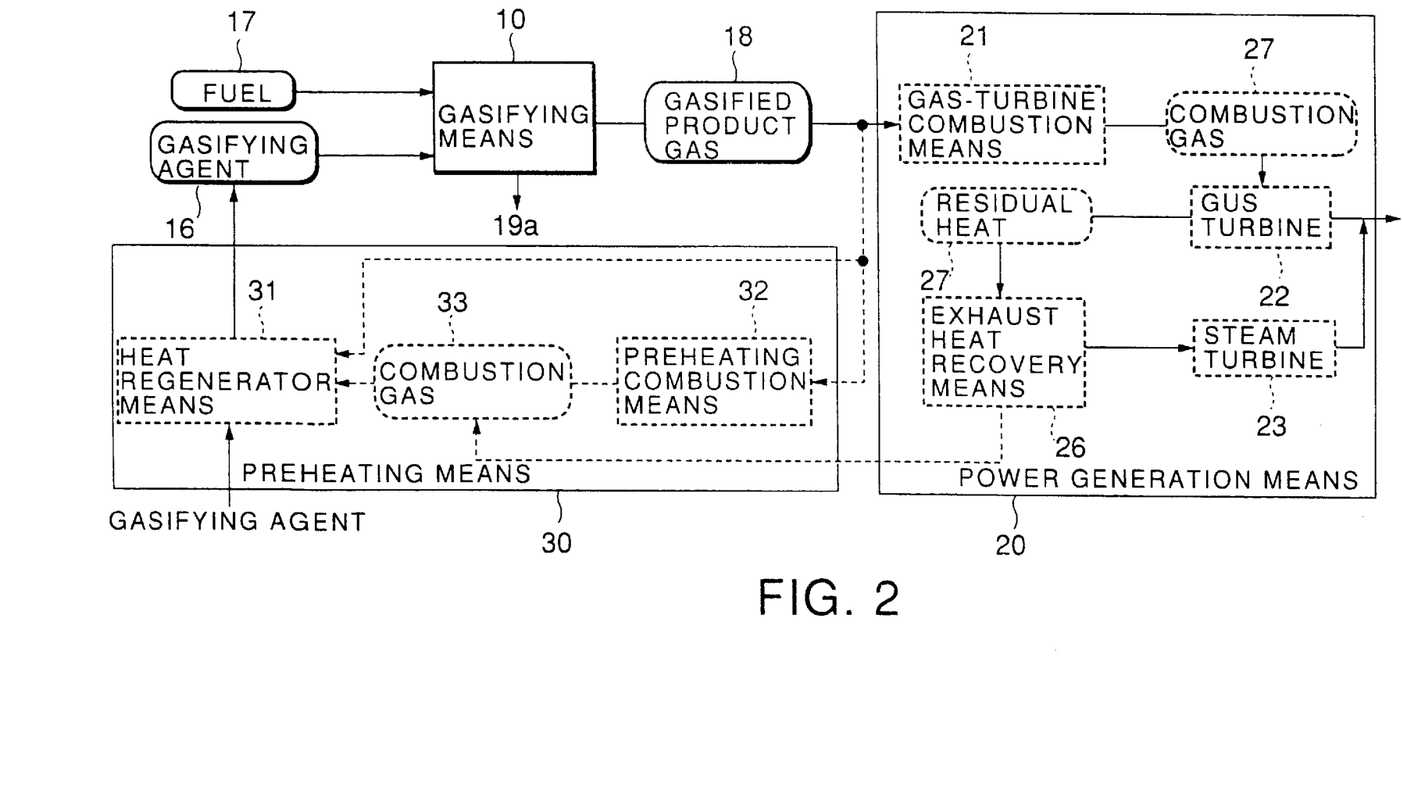
FIG. 2 is a block diagram of the first preferred embodiment of a gasification power generation system according to the present invention, which serves as the principle of the present invention.

FIG. 2 is a block diagram of the first preferred embodiment of a gasification power generation system according to the present invention, which includes the basic concept of the present invention. In FIG. 2, the same reference numbers as those of FIG. 1 denote elements, which are the same as or correspond to those of the conventional gasification power generation system.

In FIG. 2, the gasification power generation system comprises: gasifying means 10 for generating a gasified product gas by allowing a fuel 17 to react with a gasifying agent 16; power generation means 20 for generating electricity using energy, which is obtained by burning the gasified product gas 18 produced by the gasifying means 10; and preheating means 30 for preheating the gasifying agent supplied to the gasifying means 10 to a self ignition temperature of, e.g., about 1000° C. The preheating means 30 serving as a gist of the present invention can raise the temperature of air supplied into the gasifying means 10 to a high temperature of about 1000° C. when a fossil fuel, such as coal, is used as the fuel 17. Therefore, it is possible to promote the melting of ash contents to prevent slag from being solidified in the gasifier to discharge the molten slag 19a from the gasifying means 10 to the outside. In addition, since it is not required to feed a great deal of air into the gasifying means 10, it is possible to suppress the concentration of nitrogen existing in the gasified product gas 18.

Although the preheating means 30 may comprise a separate combustion equipment or the like, it can be easily obtained by utilizing the sensible heat of the gasified product gas 18 produced by the gasifying means 10. That is, as shown in FIG. 2, if the preheating means 30 is provided with heat regenerator means 31 and the gasified product gas 18 is supplied to the heat regenerator means 31 at a high temperature, it is possible to achieve the preheating with high energy efficiency. In order to supply the gasified product gas at a high temperature, the preheating means 30 has preheating combustion means 32. The gasified product gas 18 is supplied to the power generation means as well as to the preheating combustion means 32, to be burned at a high temperature by means of the combustion means 32 to supply to the heat regenerator means 31.

The power generation means 20 may be a separate generator using a gas turbine similar to conventional power generation systems, or a combined cycle power generation system having a steam turbine combined therewith. In the first preferred embodiment shown in FIG. 2, combined cycle power generation means 20 is disclosed as the best mode of the present invention. The power generation means 20 comprises: gas-turbine combustion means 21 for burning a gasified product gas 18 to produce a combustion gas 27; a gas turbine 22 for rotating a turbine by the produced combustion gas 27 to cause a generator (not shown), which is provided on a shaft (not shown), to generate electricity;

exhaust heat recovery means 26, such as a boiler, for recovering exhaust heat from residual heat of the combustion gas 27 of the gas turbine 22; and a steam turbine 23 for producing steam by recycling the recovered exhaust gas to rotate a turbine by the steam to cause a generator (not shown), which is provided on a shaft (not shown), to generate electricity. Although the construction of the above described combined cycle power generation system is not particularly new, if this construction is applied to the present invention, it is possible to raise the temperature of the combustion gas 33 burned by the preheating combustion means 32 using the residual heat of the gas turbine 22 recovered by, e.g., the exhaust heat recovery means 26.

According to the gasification power generation system in the first preferred embodiment, since the preheating means 30 preheats the gasifying agent to a self ignition temperature of about 1000° C. in order to gasify a fuel by allowing, e.g., coal serving as a fuel, to react with, e.g., air serving as a gasifying agent, it is possible to prevent slag in the gasifying means 10 from being solidified to discharge the slag as a high-temperature molten slag 19a to the outside of the gasifying means 10, so that it is possible to reduce the concentration of nitrogen in the gasified product gas 18.

Figure 3:
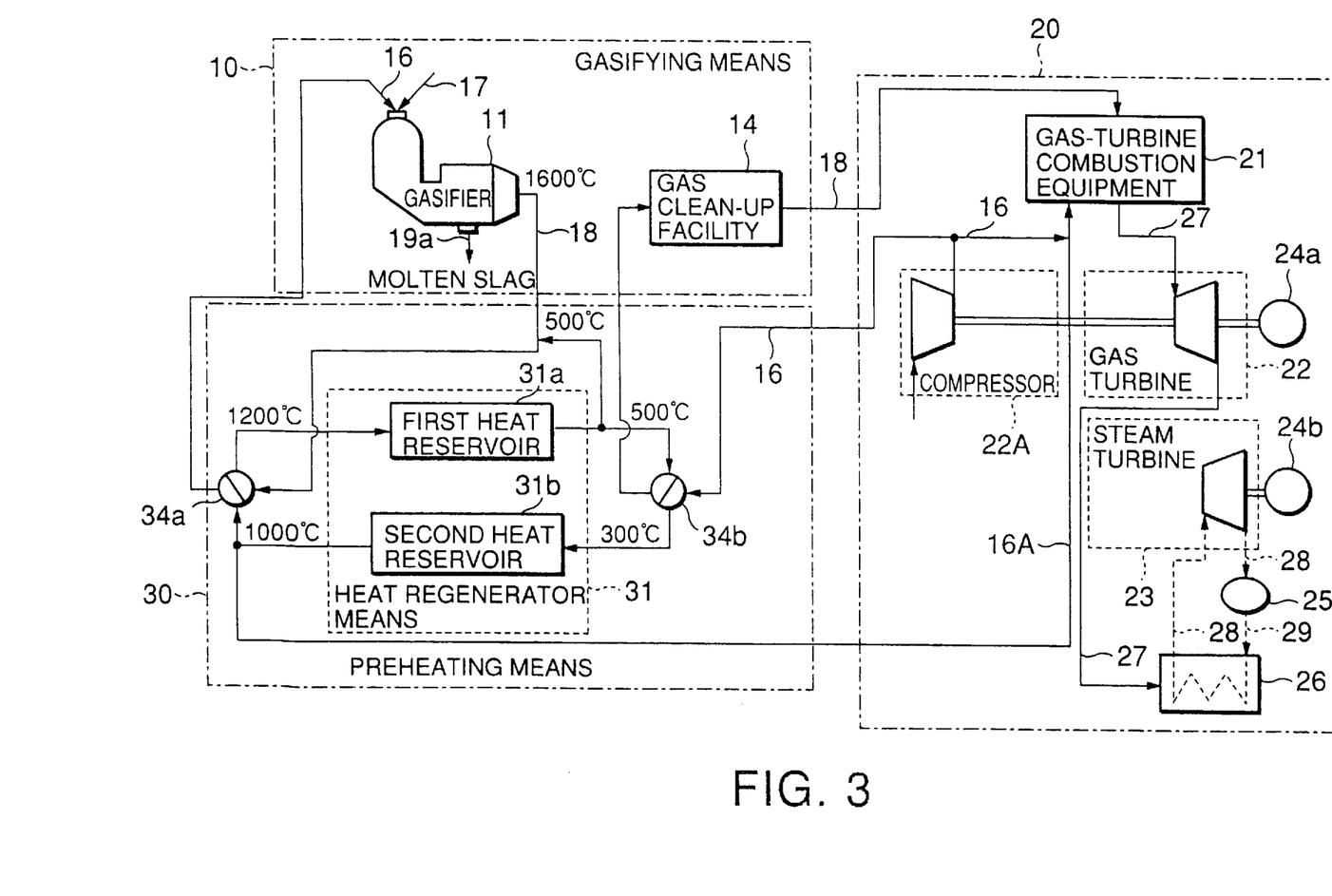
FIG. 3 is a block diagram of the second preferred embodiment of a gasification power generation system according to the present invention.
Figure 4:
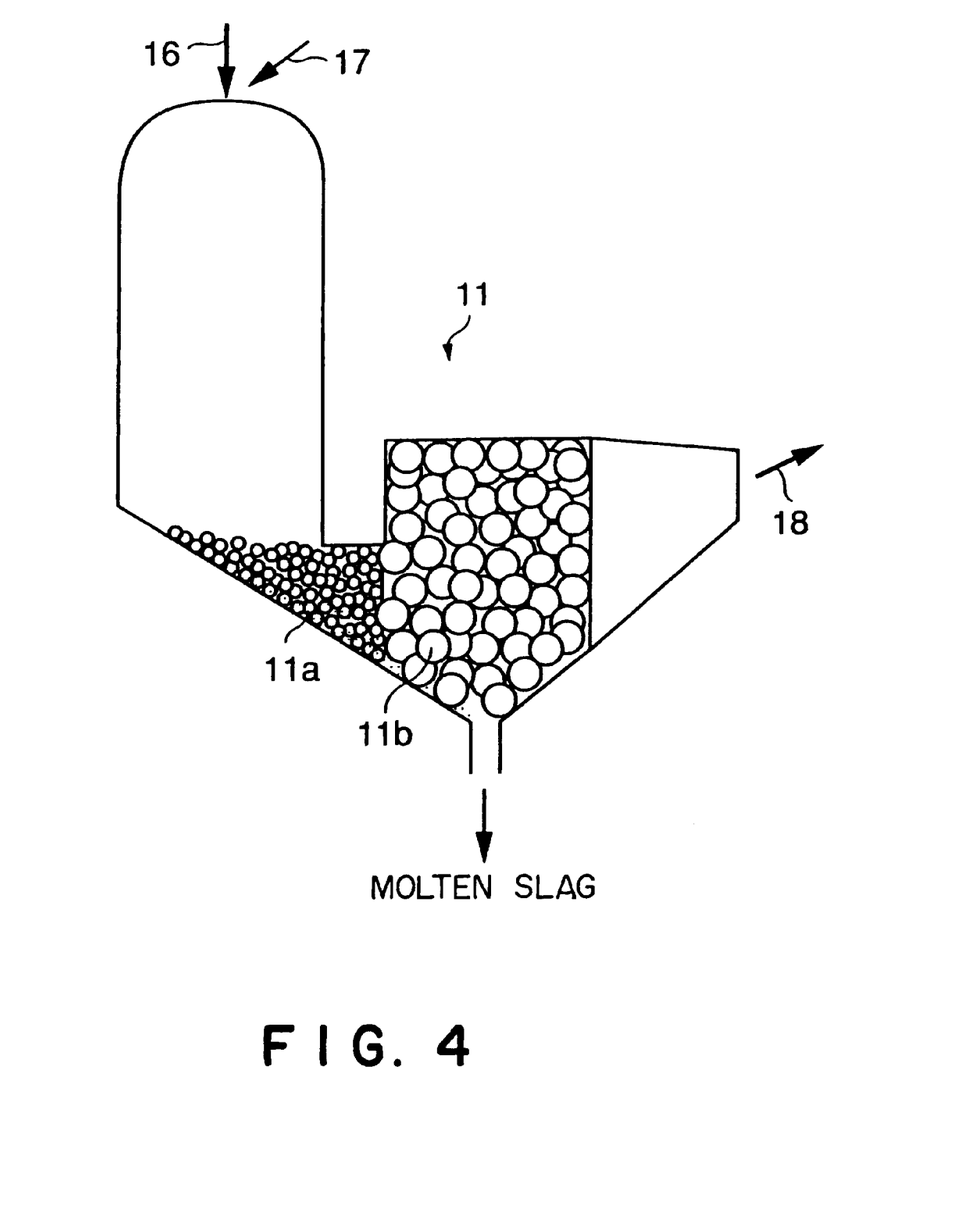
FIG. 4 is a view illustrating the detail of a gasifier in the second preferred embodiment.
Figure 5:
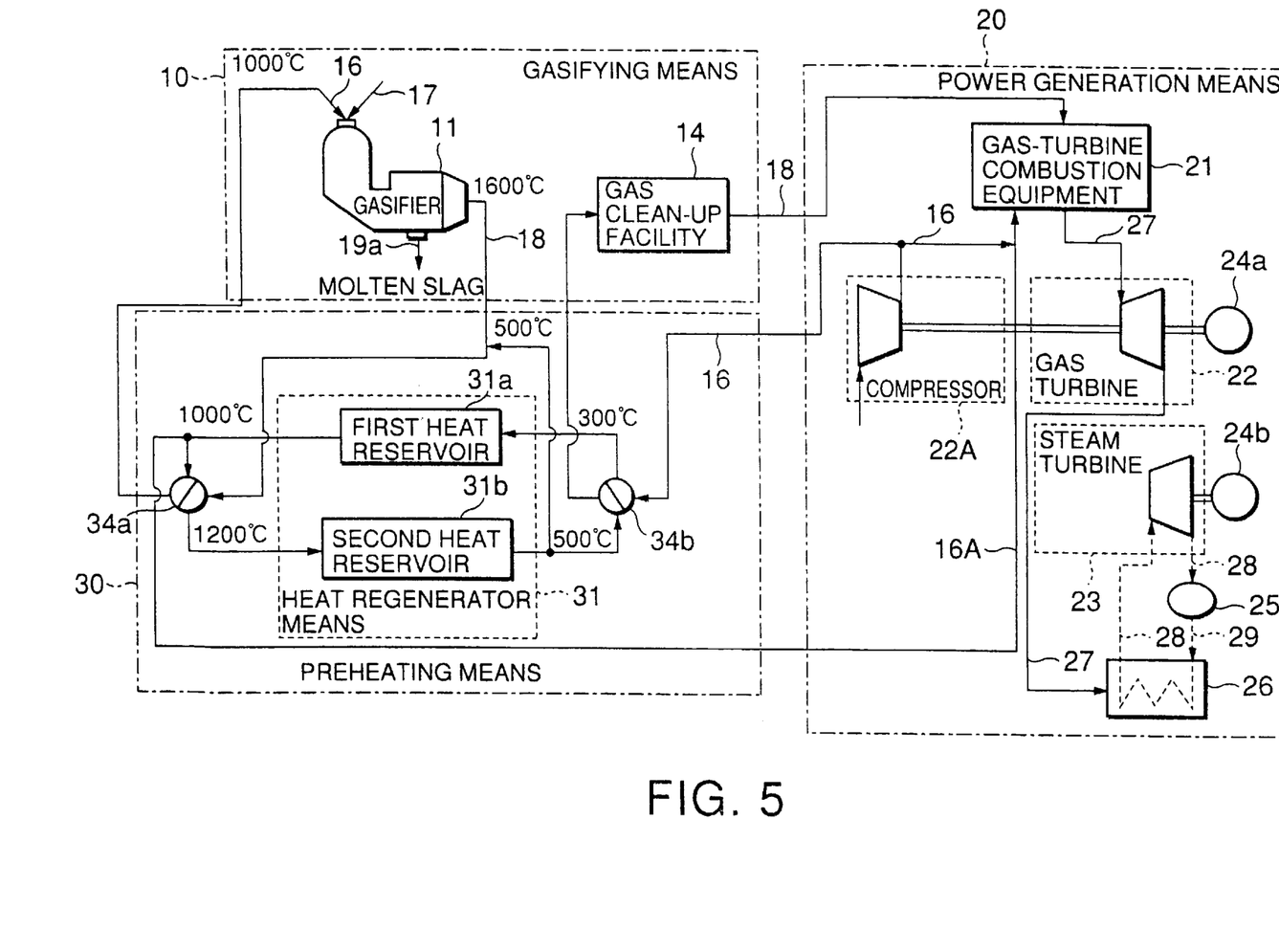
FIG. 5 is a block diagram of a gasification power generation system in the second preferred embodiment, which shows the state that a directional control valve is switched.

Referring to FIGS. 3 through 5, as a more specified embodiment of the present invention, the second preferred embodiment of a gasification power generation system, according to the present invention, will be described below.

FIG. 3 shows a schematic system of the second preferred embodiment of an integrated coal gasification combined cycle power generation system according to the present invention. In the second preferred embodiment, the integrated coal gasification combined cycle power generation system comprises gasifying means 10 having a gasifier 11 and a gas clean-up facility 14, a gas-turbine combustion equipment 21, a gas turbine 22, a compressor 22A, a steam turbine 23, generators 24a, 24b, a condenser 25, an exhaust heat recovery boiler 26, and preheating means 30 serving as a gist of the present invention.

The preheating means 30 comprises first and second heat reservoirs 31a, 31b forming heat regenerator means 31, a first high-temperature switching valve 34a, and a second low-temperature switching valve 34b. FIG. 4 shows the detail of the gasifier 11 used for the gasification power generation system in the second preferred embodiment. The gasifier 11, to which an air 16 serving as a gasifying agent and a coal 17 serving as a fuel are supplied, are filled with minute pebbles 11a and coarse pebbles 11b, which are of a material, such as alumina. The air 16 supplied at a high temperature reacts with the coal 17 to product a gasified product gas 18, which is supplied to the first value 34a, and a high-temperature molten slag 19a is discharged from the bottom.

The operation of the power generation system in the second preferred embodiment, mainly the operation of the preheating means 30, will be described below.

The air 16 (gasifying agent) of about 300° C. compressed and temperature-raised by the compressor 22A receives the thermal energy of the second heat reservoir 31b while passing through the second heat reservoir 31b, to be temperature-raised to about 1000° C. to be supplied to the gasifier 11 via the first valve 34a. The coal 17 separately supplied to the gas furnace 11 reacts with the high-temperature air 16 supplied to the gasifier 11 to be gasified to produce a gasified product gas 18. The ash contents in the coal 17 are removed from the bottom of the gasifier 11 as a molten slag 19a. If the gasified product gas 18 exiting the gasifier 11 contains char or the like, this may accumulate in the first heat reservoir 31a to cause clogging.

As shown in FIG. 4, since the gasifier 11 in the second preferred embodiment is filled with pebbles 11a, 11b of alumina, the ash contents and char can be trapped in the form of liquid, and these contents are mixed in the gasified product gas 18 to prevent outflow. While the gasified product gas 19 exiting the gasifier 11 passes through the first heat reservoir 31a, it causes the reserved sensible heat to thermal conduct to the first heat reservoir 31a to be temperature-dropped to about 500° C. to be fed to the gas clean-up facility 14. In the second preferred embodiment, in order to prevent the fine particles of fine molten slag remaining in the gasified product gas 18 without being trapped in the gasifier 11 from condensing in the first heat reservoir 31a, a part of the gasified product gas passing through the first heat reservoir to be temperature-dropped to about 500° C. is mixed with the high-temperature gasified product gas 18 of 1600° C. exiting the gasifier 11, to reduce the temperature of the gasified product gas 18 to about 1200° C., so that the gasified product gas 18 is introduced into the first heat reservoir 31a after solidifying the residual slag. The gas clean-up facility 14 removes sulfur contents and fine particles, which cause corrosion and wear of the gas turbine 22, to supply clean gasified product gas to the gas-turbine combustion equipment 21.

A part 16A of high-temperature air passing through the second heat reservoir 31b to be temperature-raised to about 1000° C. is mixed by a part 16 of air from the compressor 22A, to be temperature-controlled to be supplied to the gas-turbine combustion equipment 21. That is, the gasified product gas 18 desulfurized and dedusted by the gas clean-up facility 14 is burned in a high temperature air in the gas-turbine combustion equipment 21. Combustion using air preheated to 800–1200° C. is usually called high-temperature air combustion, and well known as a stable combustion method capable of considerably reducing NOx.

The combustion exhaust gas 27 produced by the gas-turbine combustion equipment 21 rotates the gas turbine 22 to cause the generator 24a to generate electricity, and then, it is fed to the exhaust heat recovery boiler 26. The exhaust heat recovery boiler 26 performs heat recovery to produce the steam 28 to rotate the steam turbine 23 to cause the generator 24b to generate electricity. That steam 28 exiting the steam turbine 23 is condensed by the condenser 25 to return to the exhaust heat recovery boiler 26.

The integrated coal gasification combined cycle power generation system having the above construction can cause the air 16 and the gasified product gas 18 to alternately pass through the pair of heat reservoirs 31a, 31b by switching the first high-temperature switching valve 34a and the second low-temperature switching valve 34b while interlocking the valves with each other, to continuously supply the air 16, which is preheated to a high temperature near the temperature of the gasified product gas 18, to the gasifier 11. FIG. 5 shows the state that the flows of the air 16 and the gasified product gas 18 are changed by switching the first high-temperature switching valve 34a and the second low-temperature switching valve 34b from the state shown in FIG. 3 while interlocking with each other. Furthermore, while the switching valves 34a, 34b have comprised four-way valves in the second preferred embodiment, a plurality of simple block valves may be used to provide the same function.

In a gasification combined cycle power generation system according to the present invention, since a fuel is gasified by supplying air to a gasifier after preheating the air to a high temperature of about 1000° C. by the sensible heat of the gasified product gas, it is possible to maintain the temperature in the gasifier at a high temperature sufficient to melt ash contents without the need of pure oxygen or oxygen-enriched air. Therefore, it is possible to allow slag to be easily discharged, and it is possible to greatly reduce the amount of char, which is contained in the gasified product gas and which escapes from the gasifier. Consequently, it is possible to decrease the sizes of the oxygen producing facility and/or the char recovery facility, or omit the oxygen producing facility and/or the char recovery facility. Moreover, since it is possible to reduce or omit the power required to product oxygen or oxygen-enriched air, so that it is possible to considerably improve the generating efficiency.

In addition, since the gasification combined cycle power generation system according to the present invention gasifies the fuel by supplying air, which is preheated to a high temperature of about 1000° C., to the gasifier, the amount of air required to maintain the temperature in the gasifier at a high temperature is decreased, so that the rate of completely burned fuel is decreased and the amount of nitrogen in the gasified product gas is decreased. Consequently, the heating value of the gasified product gas is increased, so that it is possible to easily maintain stable combustion in the combustion equipment.

In addition, in the gasification power generation system according to the present invention, since air of about 1000° C. is produced by using a high grade energy of higher than or equal to 1000° C., which is the sensible heat of the gasified product gas, i.e., by directly using the high grade energy without decreasing temperature, it is possible to further improve generating efficiency.

Moreover, in the gasification power generation system according to the present invention, since the gasified product gas is burned in the presence of air at a high temperature of about 1000° C., the NOx concentration in the combination exhaust gas is low and it is possible to achieve stable combustion.

Figure 6:
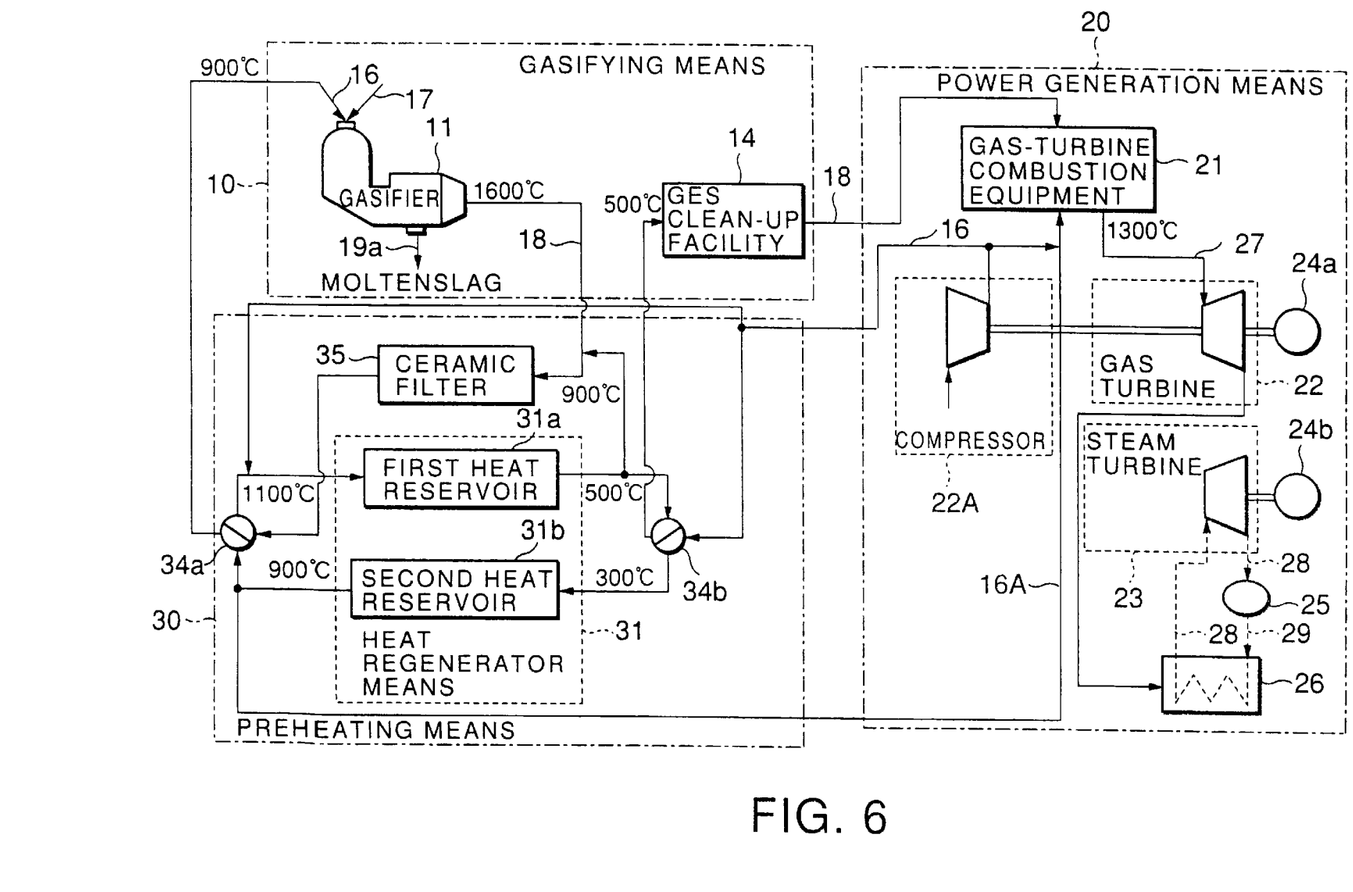
FIG. 6 is a block diagram of the third preferred embodiment of a gasification power generation system according to the present invention.

FIG. 6 shows a schematic system of the third preferred embodiment of a coal gasification power generation system according to the present invention. In the third preferred embodiment, a ceramic filter 35 is provided in a gasified product gas outlet line of the gasifier 11 in the second preferred embodiment according to the present invention shown in FIGS. 3 through 5. A gasified product gas 18 of about 1000° C. exiting the gasifier 11 is mixed with a gasified product gas of about 500° C. exiting a first heat reservoir 31a to be temperature-dropped to about 900° C., which is lower than or equal to a heat-resisting temperature of the ceramic filter 35, to be introduced into the ceramic filter 35. The gasified product gas dedusted by the ceramic filter 35 is mixed with air compressed by means of a compressor 22A, and a part thereof is burned to be temperature-raised to about 1100° C. (however, a combustion equipment is omitted) to enter a first heat reservoir 31a. The air 16 of about 300° C. compressed and temperature-raised by the compressor 22A receives the thermal energy of a second heat reservoir 31b while passing through the first heat reservoir 31a, to be temperature-raised to about 900° C. to be supplied to the gasifier 11.

In the third preferred embodiment, it is possible to obtain the same advantageous effects as those in the second preferred embodiment of the present invention shown in FIG. 3, and it is possible to trap particles, such as char, which has not been trapped in the gasifier 11. Therefore, it is possible to prevent these particles from entering the first and second heat reservoirs 31a, 31b to accumulate to increase pressure loss.

The fourth preferred embodiment of the present invention will be described below.

Figure 7:
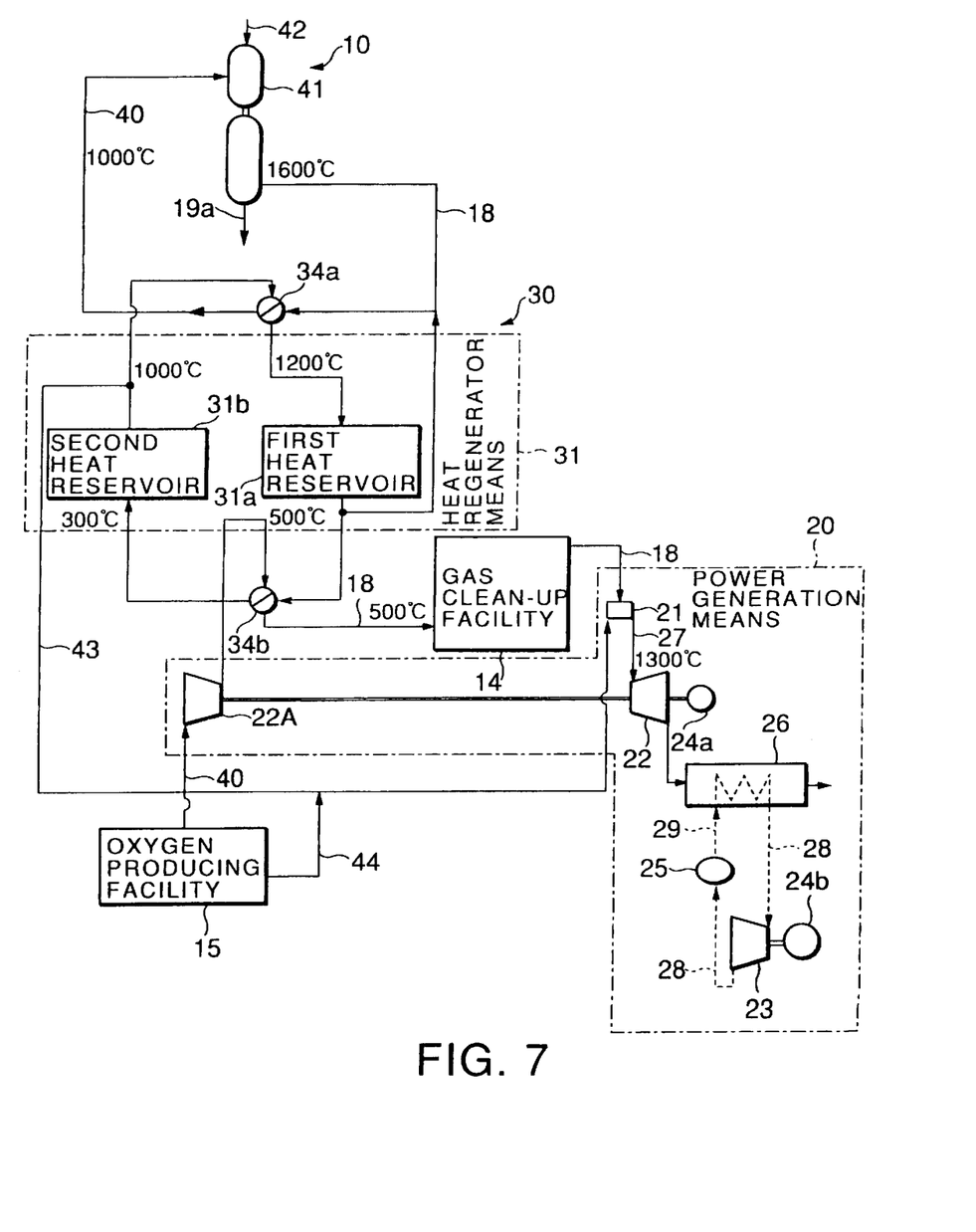
FIG. 7 is a block diagram of the fourth preferred embodiment of a gasification power generation system according to the present invention.

FIG. 7 shows a schematic system of the fourth preferred embodiment of an integrated coal gasification combined cycle power generation system according to the present invention. In the fourth preferred embodiment, a slurry feed, oxygen-blast type Texaco gasifier is used as a gasifier. Since the main construction of the fourth preferred embodiment is the same as the construction of the principal portion of the second preferred embodiment shown in FIG. 3, only the portions different from those in FIG. 3 will be described.

Oxygen 40 serving as a gasifying agent produced by an oxygen producing facility 15 is pressurized by means of a compressor 22A to be heated to about 1000° C. by means of a second heat reservoir 31b to be supplied to a Texaco gasifier 41. A supplied CWM (a mixture of powdered ash and water) 42 reacts with a high-temperature oxygen 42 to be gasified to be a gasified product gas 18. A part 43 of oxygen passing through the second heat reservoir 31b to be temperature-raised to about 1000° C. is mixed with nitrogen 44 produced by separating air in the oxygen producing facility 15, to be slightly temperature-dropped to be supplied to a gas-turbine combustion equipment 21.

As the fourth preferred embodiment shown in FIG. 7, when the present invention is applied to a gasification combined cycle power generation system using an oxygen-blast type gasifier, while the oxygen producing facility is required and the generating efficiency is reduced, the following advantageous effects are obtained.

First, the heating value of the gasified product gas is increased, so that it is possible to easily maintain stable combustion in the combustion equipment.

Secondly, since oxygen of about 1000° C. can be produced by a high grade energy of higher than or equal to 1000° C., which is the sensible heat of the gasified product gas, i.e., by directly utilizing the high grade energy without so reducing temperature, it is possible to slightly improve the generating efficiency.

Thirdly, since the gasified product gas is burned with a high-temperature oxygen-enriched air, the NOX concentration in the combustion exhaust gas is low and it is possible to achieve stable combustion.

As mentioned above, according to the coal gasification power generation system of the present invention, it is possible to enhance the generating efficiency, and to achieve stable combustion with a low concentration of nitrogen oxides (NOx).

The fifth preferred embodiment of the present invention will be described below.

Figure 8:
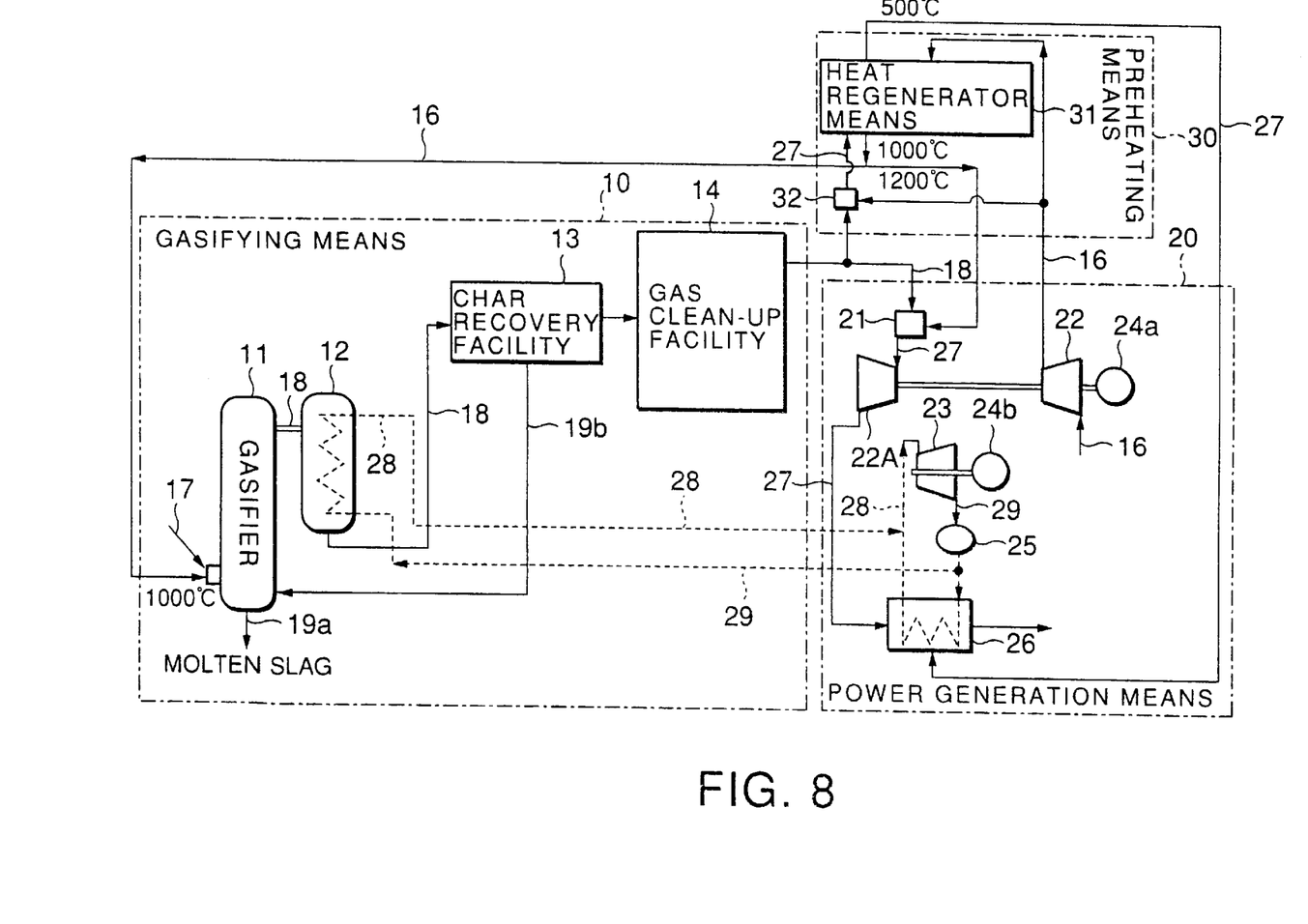
FIG. 8 is a block diagram of the fifth preferred embodiment of a gasification power generation system according to the present invention.

FIG. 8 shows a schematic system of the fifth preferred embodiment of a coal gasification power generation system according to the present invention. In fifth preferred embodiment, the coal gasification power generation system comprise a gasifier 11, gas cooler 12, a char recovery facility 13, a gas clean-up facility 14, a gas-turbine combustion equipment 21, a gas turbine 22, a compressor 22A, a steam turbine 23, generators 24a, 24b, a condenser 25, an exhaust heat recovery boiler 26, a preheating combustion equipment 32 serving as high-temperature gas producing means, and a heat regenerator 31 serving as heat regenerator means.

The operation of the gasification power generation system of FIG. 8 will be described. A coal 17 and a high-temperature air 16 are supplied to the gasifier 11 to be gasified to produce a gasified product gas 18. The principal components of the gasified product gas 18 thus produced include carbon monoxide, hydrogen, carbon dioxide, steam and so forth. The ash contents in the coal are discharged from the bottom of the gasifier 11 as molten slag 19a. The gasified product gas 18 is cooled to a suitable temperature (about 500° C.) by means of the gas cooler 12 to be fed to the gas clean-up facility 14. Most of char 19b (the principal components of which are unburned carbon and ash contents) contained in the gasified product gas 18 is recovered by the char recovery facility 13 provided between the gas cooler 12 and the gas clean-up facility 14, to be recycled in the gasifier 11. The gas clean-up facility 14 removes sulfur contents and fine particles, which cause corrosion and wear of the gas turbine 22, to supply cleaned, gasified product gas 18 to the gas-turbine combustion equipment 21.

A part of the gasified product gas 18, from which sulfur contents and fine particles have been removed by the gas clean-up facility 14, is fed to the high-temperature air producing combustion equipment 32 of the preheating means 30 to be burned with a part of the air (gasifying agent) 16 compressed by the compressor 22A. A combustion exhaust gas 27 of about 1200° C. exiting the preheating combustion equipment 32 for producing a high-temperature air passes through the heat regenerator 31 to be temperature-dropped to about 500° C. to be supplied to the exhaust heat recovering boiler 26. The residue of the air 16 compressed by the compressor 22A is preheated to about 1000° C. in the heat regenerator 31. A part of the high-temperature air 16 temperature-raised to about 1000° C. enters the gas-turbine combustion equipment 21 to burn the residue of the gasified product gas 18 with the high-temperature air. On the other hand, the residual of the high-temperature air 16 temperature-raised to about 1000° C. is fed to the gasifier 11 to be used as a gasifying agent for the coal 17.

The combustion exhaust gas 27 produced by burning the residual of the gasified product gas 18 with the high-temperature air in the gas-turbine combustion equipment 21 rotates the gas turbine 22 to cause the generator 24a to generate electricity. Moreover, the combustion exhaust gas 27 exiting the gas turbine 22 produces the steam 28 in the exhaust heat recovery boiler 26, and this steam rotates the steam turbine 23 to cause the generator 24b to generate the electricity. The combustion exhaust gas 27 exiting the heat regenerator 31 is also recycled to produce the steam 28 in the exhaust heat recovery boiler 26. The steam 28 exiting the steam turbine 23 is condensed by the condenser 25 to return to the exhaust heat recovery boiler 26. The heat recovered by the gas cooler 12 is fed to the steam turbine 23 in the form of the steam 28.

In the gasification power generation system according to the present invention, since the gasified product gas is burned with the high-temperature air, the temperature of which has been raised to about 1000° C., the NOX concentration in the combustion exhaust gas is low even if the gasified product gas is a low and it is possible to achieve stable combustion.

In addition, in the gasification power generation system according to the present invention, since the high-temperature air, the temperature of which has been raised to about 1000° C., is supplied to the gasifier to gasify the fuel, it is possible to maintain the temperature in the gasifier at a high temperature sufficient to melt ash contents without the need of pure oxygen or oxygen-enriched air. Therefore, it is possible to allow slag to be easily discharged and to considerably decrease the amount of char escaping from the gasifier with the gasified product gas. Consequently, it is possible to omit the oxygen producing facility and/or the char recovery facility or decrease the sizes thereof, so that it is possible to reduce the costs of the system. Moreover, since it is possible to eliminate (or reduce) power required to produce oxygen (or oxygen-enriched air), it is possible to considerably improve the generating efficiency.

Moreover, in the gasification power generation system according to the present invention, since the high-temperature air, the temperature of which has been raised to about 1000° C., is supplied to the gasifier to gasify the fuel, it is possible to reduce the amount of air required to maintain the temperature in the gasifier at a high temperature, so that it is possible to reduce the rate of the completely burned fuel, and it is also possible to reduce the amount of nitrogen in the gasified product gas. Consequently, the heating value of the gasified product gas is increased, so that it is possible to easily maintain stable combustion in the combustion equipment.

The sixth preferred embodiment of the present invention will be described below.

Figure 9:
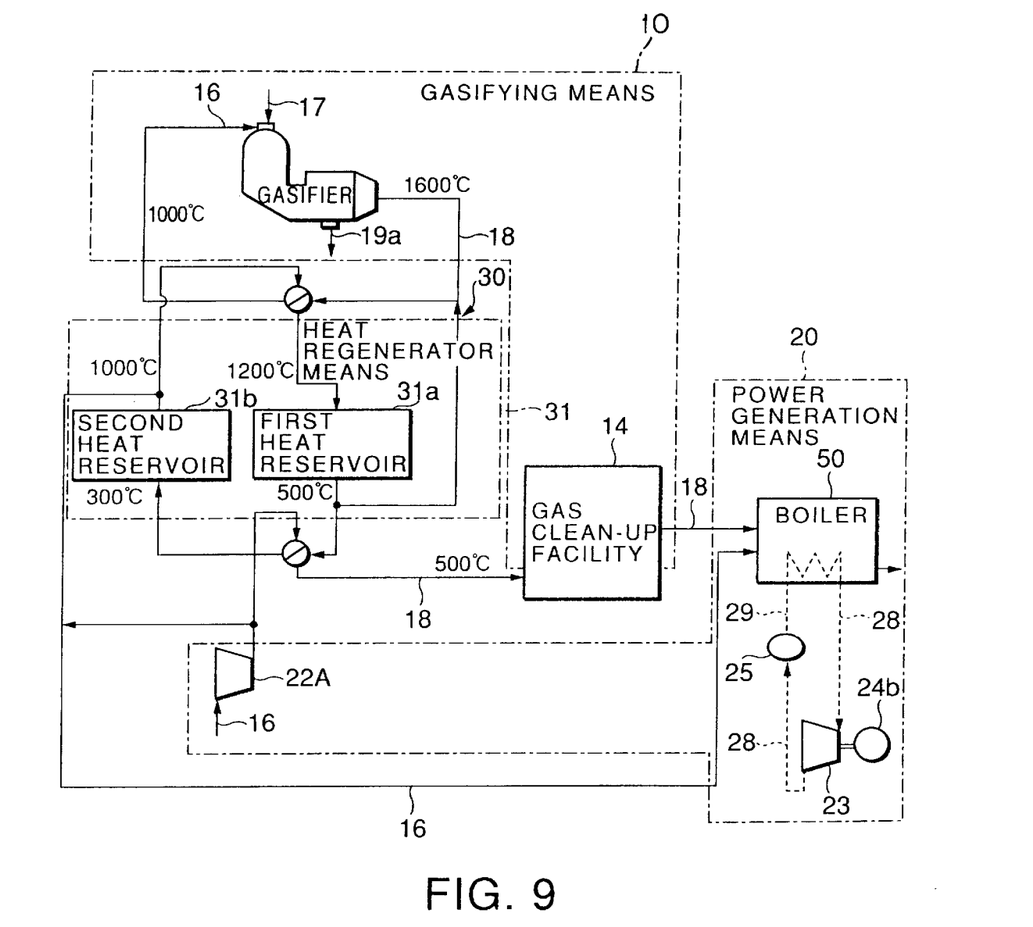
FIG. 9 is a block diagram of the sixth preferred embodiment of a gasification power generation system according to the present invention.

FIG. 9 shows a schematic system of the sixth preferred embodiment of a gasification power generation system according to the present invention. Since the main construction of the gasification power generation system in the sixth preferred embodiment is substantially the same as that in the second preferred embodiment shown in FIG. 3, only constructions different from those of FIG. 3 will be described. A gasified product gas 18 cleaned by a gas clean-up facility 14 is fed to a boiler 50 to be burned with a part of a high-temperature air 16 heated by a second heat reservoir 31b to produce a steam 28. This steam 28 rotates a steam turbine 23 to cause a generator 24b to generate electricity. The steam 28 exiting the steam turbine 23 to be condensed by a condenser 25 to be a water 29 to return to the boiler 50.

In the sixth preferred embodiment, only the steam turbine of the power generation system in the second preferred embodiment shown in FIG. 3 is used as generating means 20. According to the sixth preferred embodiment, it is possible to obtain the same functions and advantageous effects as those in the second preferred embodiment. In addition, since no gas turbine is provided in the sixth preferred embodiment, it is possible to reduce the pressure in the gasifier to save operating energy consumed by a compressor 22A. Consequently, although the quantity of generated electricity is decreased since the scale of the generating means 20 is small, the system in this preferred embodiment is particularly suitable for a relatively small scale of gasification power generation system (e.g., when the fuel 17 is garbage, waste, residual oil, waste plastic).

The seventh preferred embodiment of the present invention will be described below.

Figure 10:
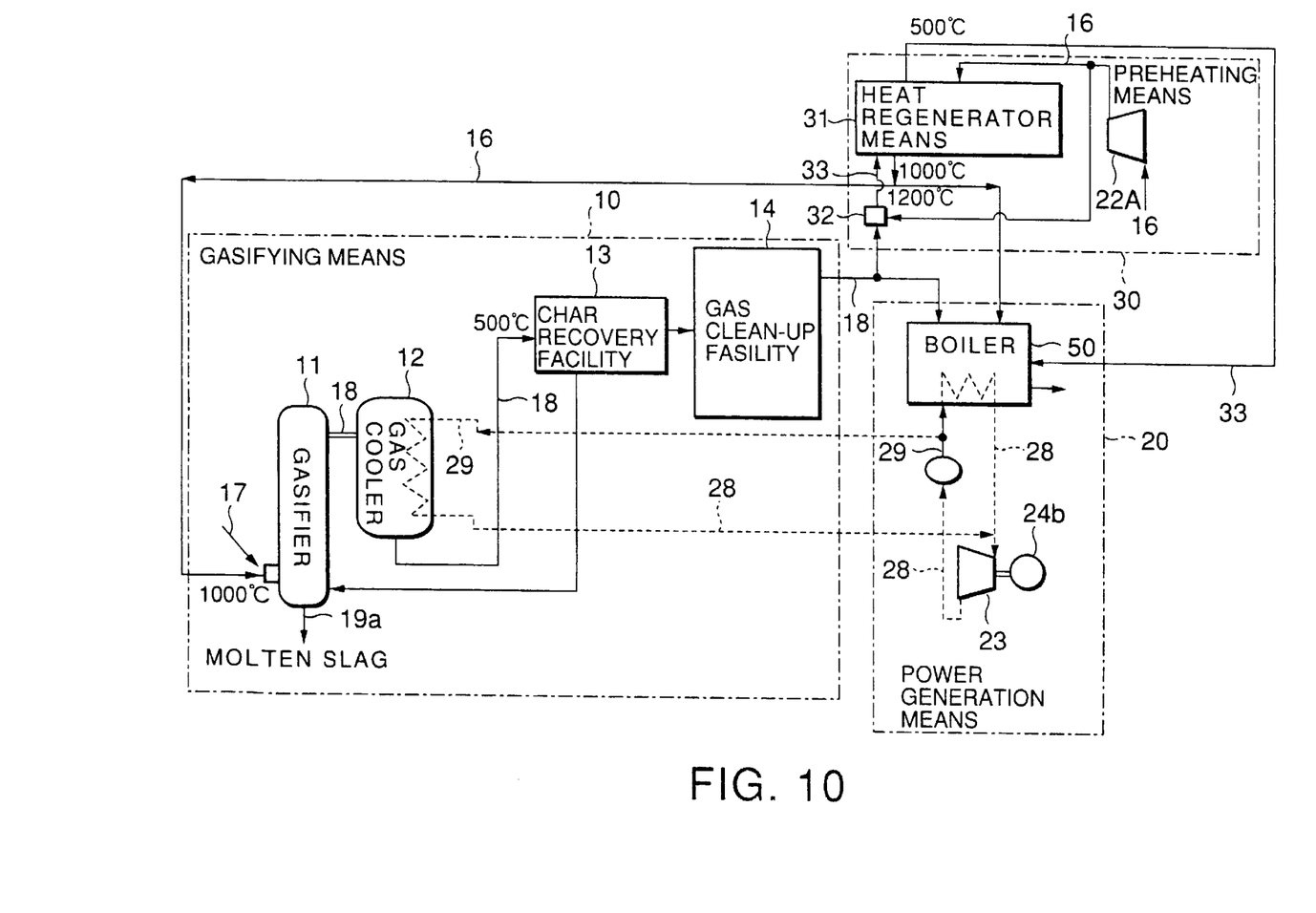
FIG. 10 is a block diagram of the seventh preferred embodiment of a gasification power generation system according to the present invention.

FIG. 10 shows a schematic system of the seventh preferred embodiment of a gasification power generation system according to the present invention. Also in the seventh preferred embodiment, only main constructions different from those of FIG. 8 will be described. A part of a gasified product gas 18, from which sulfur contents and fine particles have been removed by a gas clean-up facility 14, is supplied to a preheating combustion equipment 32 for producing a high-temperature air, to be burned with a part of air 16 serving as a gasifying agent compressed by a compressor 22A. A combustion exhaust gas 33 of about 1200° C. discharged from the combustion equipment passes through a heat regenerator 31 to be temperature-dropped to about 500° C. to be supplied to a boiler 50. The residue of the air compressed by the compressor 22A is preheated to about 1000° C. by means of the heat regenerator 31.

A part of the high-temperature air, the temperature of which has been raised to about 1000° C., is supplied to the boiler 50 to burn the residue of the gasified product gas 18 with the high-temperature air. On the other hand, the residue of the high-temperature air 16, the temperature of which has bene raised to about 1000° C. is fed to a gasifier 11 to be utilized as a gasifying agent for coal 17. The combustion exhaust gas 33 existing the heat regenerator 31 is also used to produce a steam 28 in the boiler 50. In the seventh preferred embodiment, only the steam turbine in the gasification power generation system in the fifth preferred embodiment is used as power generation means 20, so that it is possible to obtain the same advantageous effects as those in the preferred embodiment shown in FIG. 8.

In addition, since no gas turbine is provided in the seventh preferred embodiment, it is possible to reduce the gasifying pressure to save operating energy consumed by the compressor 22A. Consequently, although the quantity of generated electricity is decreased since the scale of the generating means 20 is small, the system in this preferred embodiment is particularly suitable for a relatively small scale of gasification power generation system (e.g., when the fuel 17 is garbage, waste, residual oil, waste plastic).

Figure 11:
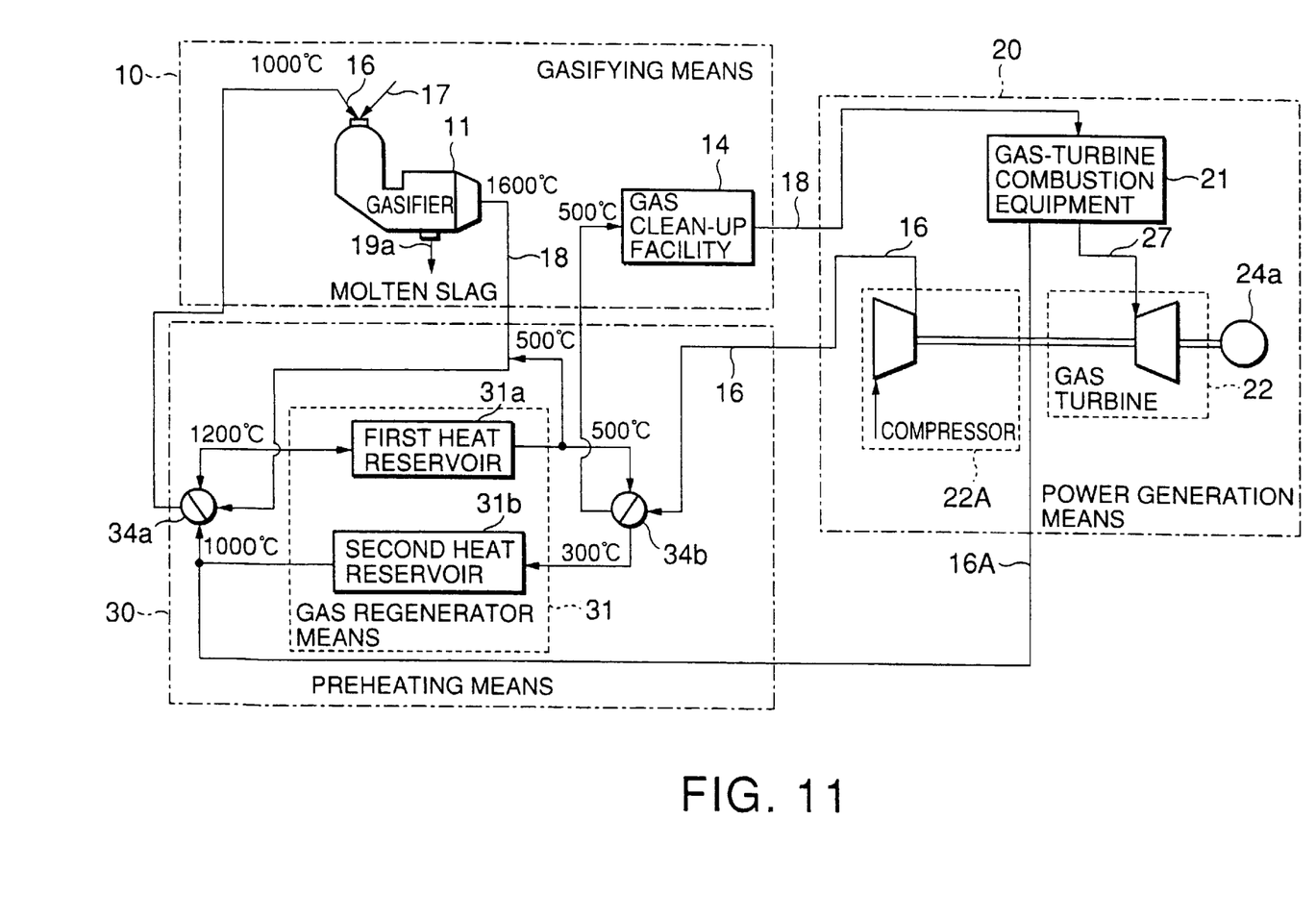
FIG. 11 is a block diagram of the eighth preferred embodiment of a gasification power generation system according to the present invention.

While only a combined cycle power generation system, which as a gas turbine and a steam turbine, and a steam-turbine power generation unit having only a steam turbine have been described in the above described preferred embodiments, the present invention should not be limited thereto, the present invention may be applied to a power generation unit having only a gas turbine. For example, the eighth embodiment of a gasification power generation system according to the present invention, which is shown in FIG. 11, has a gas-turbine power generation unit. The gas-turbine power generation unit comprises a gas-turbine combustion equipment 21, a gas turbine 22, a compressor 22A and a generator 24a. To the gas-turbine combustion equipment 21, a gasified product gas cleaned by a gas clean-up facility 14 of gasifying means 10 is supplied, and a compressed air is supplied from the compressor 22A. To the compressed air, thermal energy of about 1000° C. is supplied from a second heat reservoir 31b of a heat regenerator means 31 forming preheating means 30.

Figure 12:
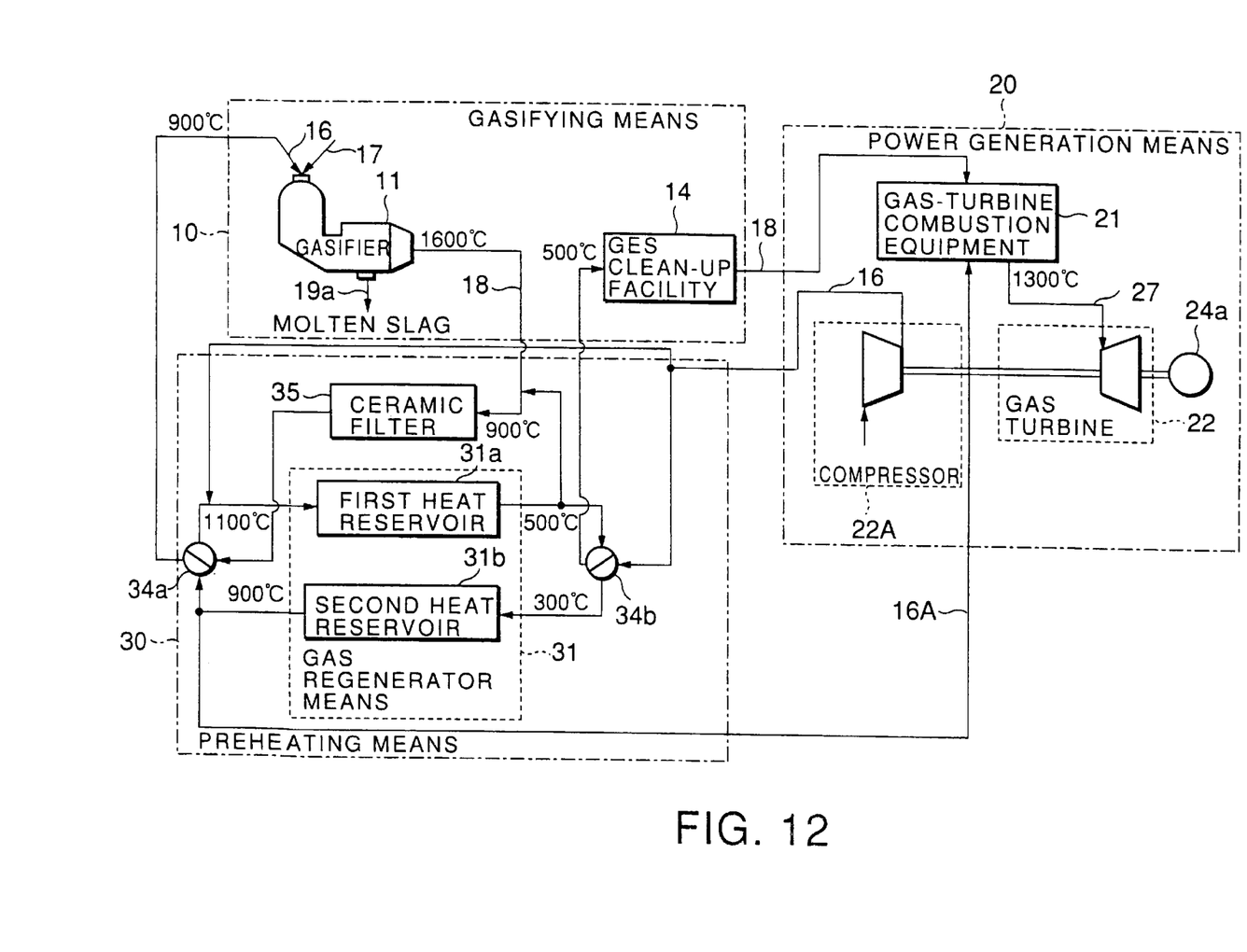
FIG. 12 is a block diagram of the ninth preferred embodiment of a gasification power generation system according to the present invention.

As the ninth preferred embodiment of the present invention shown in FIG. 12, while power generation means 20 may comprise the same gas-turbine power generation unit as that in the eighth preferred embodiment, a first valve 34a of preheating means 30 may be provided with a ceramic filter 35 for dedusting a gasified product gas 18 supplied from a gasifier 11. That is, the advantages of the present invention can be obtained if the temperature of the gasifying agent supplied to the gasifying means 10 is raised to the self ignition temperature of the fuel by the thermal energy supplied by the preheating means 30.

While coal gasification power generation systems using coal as a fuel have been described in the above preferred embodiments, the present invention should not be limited to systems using coal a fuel, but it may be applied to other gasification power generation systems using, as a fuel, heavy oils, such as residual oils, garbage, waste and so forth. Throughout the specification, the gasifying agent may be fed to a gasifier to be a gasifying agent, or fed to a gas-turbine combustion equipment to be supplied to an oxidizing agent.

What is claimed is:

1. A gasification power generation system comprising:
   a gasifying section configured to allow a fuel to react with a gasifying agent to produce a gasified product gas;
   a power generation section configured to generate electricity using energy obtained by burning said gasified product gas; and
   a preheating section configured to preheat said gasifying agent to a self-ignition temperature of said fuel, said preheating section including a high-temperature gas producing element configured to burn a part of the gasified product gas to preheat said gasifying agent by generated heat of combustion.

2. A gasification power generation system as set forth in claim 1, wherein said power generation section has a gas turbine power-generating unit including:
   a gas-turbine combustion device configured to burn the gasified product gas to produce a combustion gas;
   a gas turbine configured to generate electricity using the combustion gas; and
   wherein said gasifying agent preheated by said high-temperature gas producing element is supplied to said gas-turbine combustion device to burn a residue of said gasified product gas at a high temperature.

3. A gasification power generation system as set forth in claim 2, wherein said power generation section further has a gasification combined cycle power generation unit including:
   an exhaust heat recovery device configured to recover residual heat contained in an exhaust gas after said gas turbine generates electricity; and
   a steam turbine configured to produce steam using exhaust heat recovered by said exhaust heat recovery device to generate electricity with the steam; and
   wherein said preheating section applies said exhaust gas, the temperature of which is reduced after being used to preheat said gasifying agent, to said exhaust heat recovery device.

4. A gasification power generation system as set forth in claim 1, wherein said gasifying agent preheated at least equal to or higher than 800° C. by said high-temperature gas producing element is supplied to said gasifying section to gasify said fuel.

5. A gasification power generation system as set forth in claim 1, wherein said high-temperature gas producing element includes:
   a preheating combustion apparatus configured to burn said gasified product gas to obtain a combustion exhaust gas; and
   a heat generator device configured to preheat said gasifying agent with thermal energy of said combustion exhaust gas.

6. A gasification power generation system as set forth in claim 1, wherein said power generation section has a steam turbine power generation unit including:
   a boiler configured to produce steam by burning said gasified product gas; and
   a steam turbine configured to generate electricity by said steam;
   wherein said gasified product gas is supplied from said gasifying section to said boiler, and a residual of heat energy which was used in said preheating section is also supplied to said boiler.

7. A gasification power generation system as set forth in claim 1, wherein said preheating section includes a temperature raising element configured to raise a temperature of the gasifying agent supplied to said gasifying section at least equal to or higher than 800° C.

8. A gasification power generation system as set forth in claim 1, wherein said gasifying section produces said gasified product gas using, as said fuel, one of coal, heavy oil, garbage, waste, and a mixture of said fuel with water.

9. A gasification power generation system as set forth in claim 1, wherein said gasifying section produces said gasified product gas using, as said gasifying agent, one of air, oxygen and oxygen-enriched air.

* * * * *